J. P. KEENER.
SHOE FILLER COMPOSITION.
APPLICATION FILED DEC. 27, 1909.
1,019,964.
Patented Mar. 12, 1912.
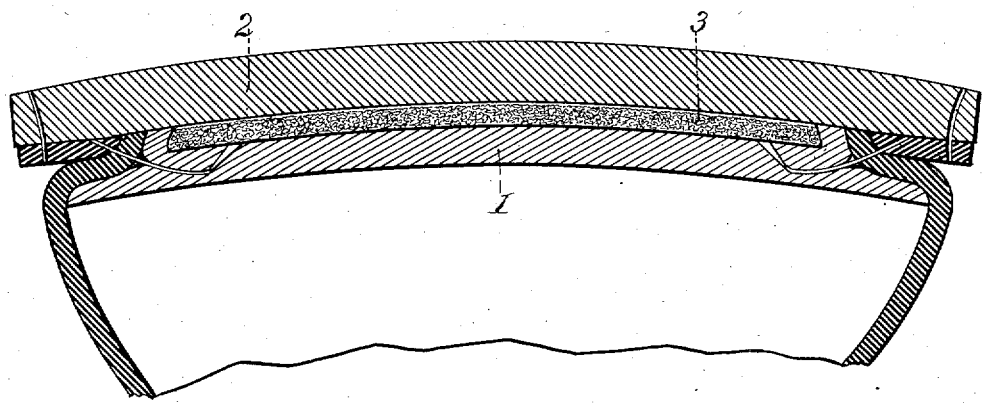
Witnesses:
N. E. Remick,
E. F. Kniac.
Inventor:
James P. Keener
By Francis J. V. Dakin
his Atty

UNITED STATES PATENT OFFICE.

JAMES P. KEENER, OF BROCKTON, MASSACHUSETTS.

SHOE-FILLER COMPOSITION.

1,019,964. Specification of Letters Patent. Patented Mar. 12, 1912.

Application filed December 27, 1909. Serial No. 535,111.

*To all whom it may concern:*

Be it known that I, JAMES P. KEENER, a citizen of the United States, residing at Brockton, in the county of Plymouth and State of Massachusetts, have invented a new and useful Improvement in Shoe-Filler Composition, of which the following is a specification, reference being had therein to the accompanying drawings.

This invention relates to a composition for shoes in filling the space between the insole and the outer sole of a shoe.

In the manufacture of welted shoes a space is produced between the insole and the outer sole and this space is commonly filled with a plastic composition adapted to set and harden after its insertion sufficiently to prevent it from flowing between the soles.

The object of the present invention is to produce a composition suitable for use as a shoe filler, which shall be flexible, waterproof, durable, odorless and inexpensive, and which may be conveniently handled in applying it to shoes.

To the above ends my invention consists in the composition hereinafter described as defined in the succeeding claims.

The accompanying drawing is a cross-section of a shoe illustrating the manner in which the filler is embodied therein.

My improved filler comprises a binder and a base. For the binder I employ, in the preferred embodiment of the invention, a composition consisting of rosin oil, rosin dextrin and resin derived from a gum. Various resins of this character may be employed but I have found that the best results are secured by using what is known to the trade as "opaque", namely, resin extracted from pontianac gum and reduced to powdered form. The ingredients are preferably used in substantially the following proportions: Rosin 3 parts; opaque or other resin derived from a gum 2 parts; rosin oil 2 parts; dextrin 2 parts.

The ingredients of the binder are heated sufficiently to melt the rosin and opaque or other resin and are then thoroughly mixed. As a base one may employ any inexpensive solid granular or pulverulent material such as saw-dust, ground leather scraps, cork or asbestos fiber since the function of this ingredient of the filler is merely mechanical, to give the requisite bulk and solidity. The binder is mixed with the body when hot, the amount of binder used depending upon the nature of the body and being sufficient to bind the particles of the body firmly together and make a substantially solid and impervious composition. The filler may be molded when hot into masses of convenient form and size, which maintain their form and may be conveniently handled when cold, the filler being normally non-sticky.

If desired the filler may be ground or crushed when cold into a granulated form and marketed in convenient packages.

When the filler is to be used it is heated, preferably in a steam-jacketed receptacle, to a temperature sufficient to soften the binder. A temperature of about 212 degrees, or that of boiling water is sufficient for this purpose. When so heated the filler acquires a pasty consistency and may then be conveniently applied to the shoe. For this purpose a knife or flat spreader is used.

In the drawing the shoe is represented as having an insole 1 and an outer sole 2 between which is a body 3 of the filler of substantially uniform thickness extending from the inseam at one side of the shoe to the inseam at the other side.

The filler heretofore described is firm but elastic when cold and is also waterproof in a high degree. The opaque or other resin derived from a gum gives the filler the valuable characteristic of remaining flexible even at a very low temperature, so that the filler does not crack and disintegrate when the shoe is used in winter. The rosin imparts the necessary firmness to the filler and also constitutes an inexpensive ingredient therefor. The rosin oil increases the fluidity of the filler so as to permit its being applied to the shoe at a comparatively low temperature. Other and similar oils may be used in place of rosin oil but the latter is preferable and I have found that it gives the best results in that it will not permeate the leather sole of the shoe in the course of wear. The dextrin has the effect of preventing the filler from clinging to the knife or spreader when it is applied, which renders it unnecessary to heat the spreader. The dextrin may be omitted from the composition, however, as it is not essential, but in this case the spreader must be heated substantially to the same temperature as the filler before and during its use in applying the filler, and the filler must also be worked at a somewhat higher temperature than when dextrin is used.

While the proportionate amounts of the various ingredients which I have described have been found to be satisfactory in practical use of the filler, the composition may be varied in this respect without departure from the nature of the invention. As described, however, the composition has, in addition to the advantages already described, the advantage of being inexpensive, easy to work, odorless and uninflammable.

What I claim is:—

1. A composition for filling shoes comprising a base of comminuted solid material and a binder comprising rosin, resin derived from a gum and oil.

2. A composition for filling shoes comprising a base of comminuted material and a binder comprising rosin, resin derived from a gum, oil and dextrin.

3. A composition for filling shoes comprising a base of comminuted solid material and a binder consisting of rosin, resin derived from a gum, rosin oil and dextrin.

4. A composition for filling shoes, comprising a base of comminuted solid material and a binder consisting of rosin, 30%, resin derived from a gum 30%, rosin oil 20% and dextrin 20%.

5. A composition for filling shoes, comprising a base of comminuted solid material and a binder consisting of three parts of rosin, three parts of resin derived from a gum and two parts of rosin oil.

6. A composition for filling shoes comprising a base of comminuted material and a binder comprising rosin, opaque and oil.

7. A composition for filling shoes comprising a base of comminuted material and a binder comprising rosin, opaque, rosin oil and dextrin.

In witness whereof, I hereunto set my hand, in the presence of two subscribing witness, this the eleventh day of December, 1909.

JAMES P. KEENER.

Witnesses:
 CHARLES F. RICHARDSON,
 E. F. UNIAR.